Sept. 2, 1924.　　　　　　　　　　　　　　　　1,507,457
A. BRIGDEN
BOLL WEEVIL MACHINE
Filed Feb. 14, 1922　　　　3 Sheets-Sheet 1

WITNESSES
Howard D. Orr
Harry E. Seidel

INVENTOR,
Arthur Brigden,
BY
ATTORNEY

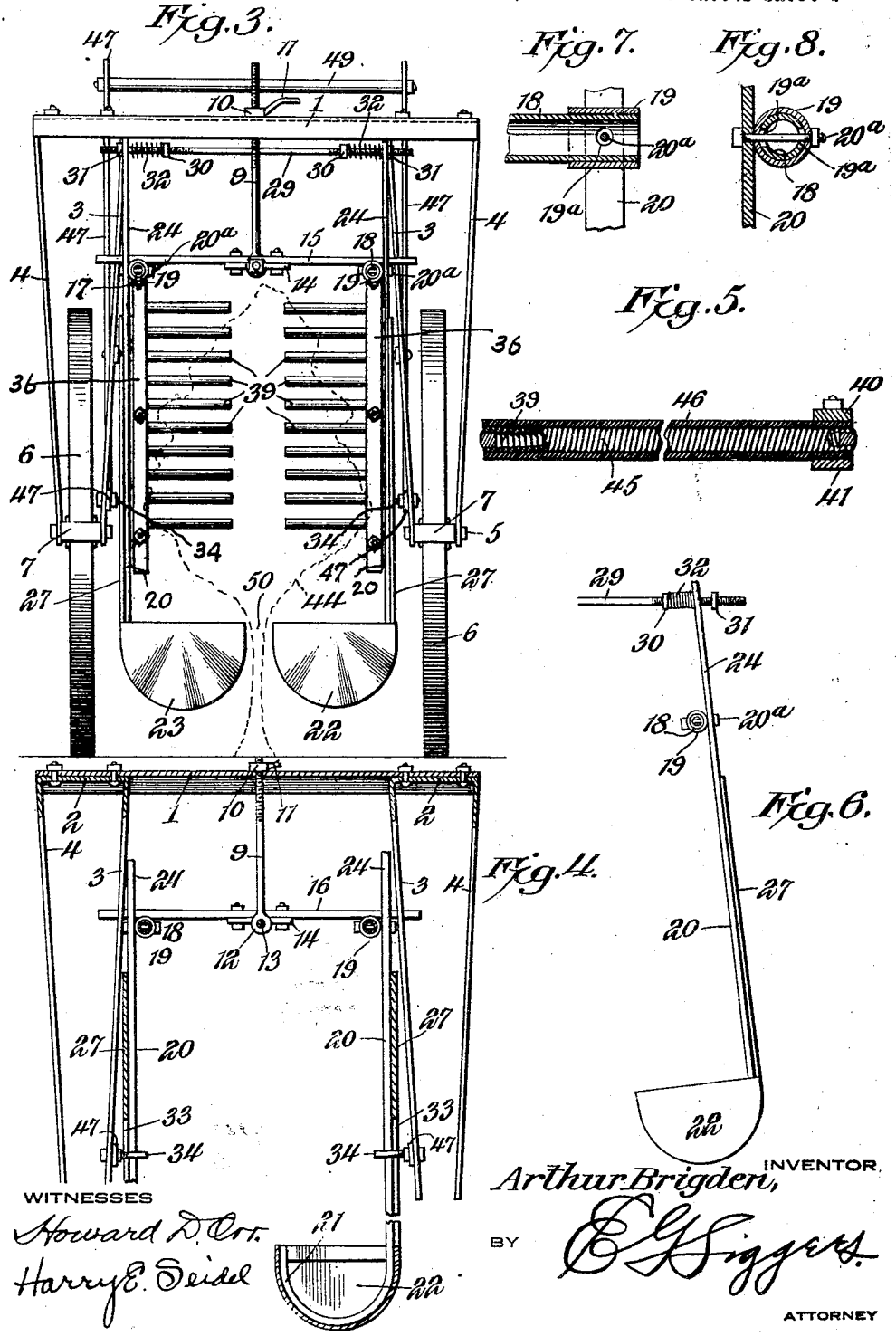

Sept. 2, 1924.

A. BRIGDEN

BOLL WEEVIL MACHINE

Filed Feb. 14, 1922   3 Sheets-Sheet 3

WITNESSES
Howard D. Orr.

INVENTOR,
Arthur Brigden,
BY
E. G. Siggers
ATTORNEY

Patented Sept. 2, 1924.

1,507,457

UNITED STATES PATENT OFFICE.

ARTHUR BRIGDEN, OF BIRMINGHAM, ALABAMA.

BOLL-WEEVIL MACHINE.

Application filed February 14, 1922. Serial No. 536,601.

*To all whom it may concern:*

Be it known that I, ARTHUR BRIGDEN, a citizen of the United States, residing at Birmingham, in the county of Jefferson and State of Alabama, have invented a new and useful Boll-Weevil Machine, of which the following is a specification.

This invention relates to devices for catching and destroying insects that are destructive to growing plants, and is more particularly directed to a new and improved means for exterminating boll weevils.

An object of this invention is the provision of a new and improved device for destroying insects which is capable of a plurality of adjustments whereby the insect destroying device may be used at all stages of the growing plants.

The invention further contemplates the provision of a new and improved device for destroying insects which is capable of automatic adjustment when the plants passing through the same, or some obstruction, tends to jam and impede the progress of the device along the rows, whereby the passage through which the plants are adapted to travel will automatically widen and permit the plants or obstruction to pass readily therethrough.

The invention also includes a battery of insect destroying devices capable of operating on a plurality of rows of plants simultaneously, the separate devices being adjustable towards or away from each other in order that each device may be properly positioned to straddle a row.

The invention will be best understood from a consideration of the following detailed description taken in connection with the accompanying drawings forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 3 is a front end view of the device.

Fig. 4 is a transverse vertical section of a fragmentary view of the same with the finger supporting arms omitted in order to illustrate the trough hangers more clearly.

Fig. 5 is a longitudinal section of a flexible finger for shaking the insects from the plants.

Fig. 6 is a fragmentary view in detail, showing one of the hangers and one of the troughs forced outwardly by some obstruction located in the path of the machine.

Fig. 7 is a fragmentary view in section disclosing the pivotal connection between the trough hangers and the longitudinal supporting rods.

Fig. 8 is a transverse section of the same.

Fig. 9 is a front view of a boll weevil machine supplied with a plurality of insect destroying devices.

Fig. 10 is a plan view of the same.

Figure 1:
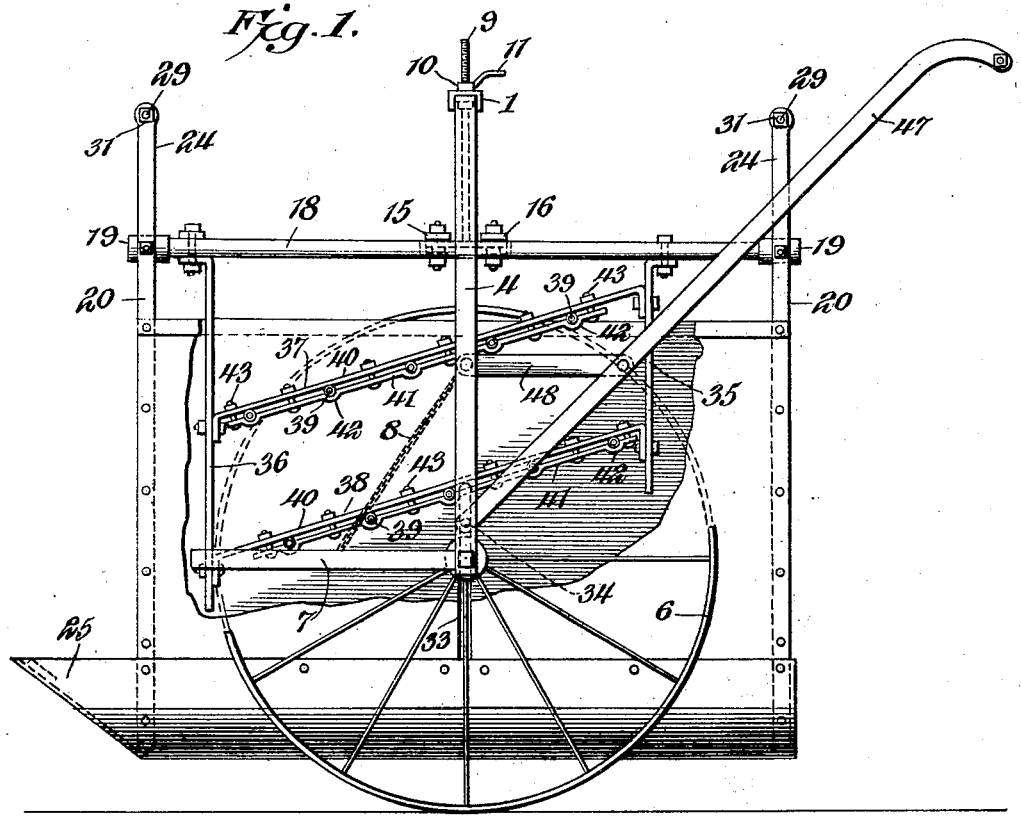
Fig. 1 is a side elevation of the boll weevil machine with parts removed to disclose the interior construction of the same.
Figure 2:
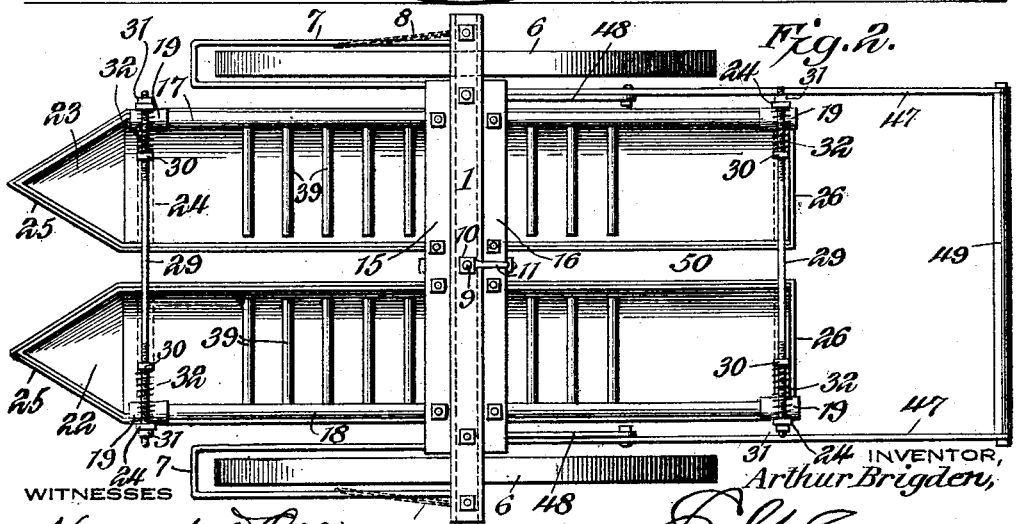
Fig. 2 is a plan view of the boll weevil machine.

Referring first to the form of the invention shown in Figs. 1 to 8, inclusive, of the drawings, 1 designates a transverse inverted channel bar. The base or middle portion 2 of an inverted U-shaped axle hanger or support is secured by means of bolts to the underside of the base of the channel bar 1, and it fits between the depending sides of said channel bar. The depending legs 3 and 4 of the U-shaped hanger are disposed at an acute angle to the base portion 2, thereby causing the lower ends of the legs 3 and 4 to be spaced at a less distance apart than the upper ends of said legs. The lower ends of the legs 3 and 4 of each hanger are perforated to form bearings in which are secured axles 5. Wheels 6 are rotatably mounted on the axles for supporting the boll weevil machine. Forwardly projecting U-shaped straps 7, partially embracing the wheels, are pivotally mounted upon the axles 5 and held in a horizontal position by means of chains 8 connected to the straps 7 and to the inverted U-shaped support.

A separate frame adapted to carry troughs and the flexible fingers for shaking the insects from the growing plants is centrally suspended by means of an eye-bolt 9 from the transverse channel bar 1. The eye-bolt 9 is provided with threads at its upper end which are engaged by a crank nut 10 seated on the channel bar 1 and provided with a handle 11 for rotating the nut, whereby the frame is elevated or lowered relative to said channel bar. Through the eye 12 of the bolt 9 is inserted a pivot pin or bolt 13, which is held in place by means of plates 14 secured to transverse bars 15 and 16 spaced from each other and located upon opposite sides of the channel bar 1 but in a lower plane. The transverse bars are secured by means of bolts to horizontal tubes or rods 17 and 18, which form part of the supporting frame of the boll weevil exterminator and extend longitudinally of the same.

Upon the opposite ends of the tubes 17 and 18 are loosely mounted sleeves 19, which afford a means for mounting the vertical hangers 20. The hangers 20 are formed of flat bars of metal and are perforated intermediate their ends as are the sleeves 19. The ends of the longitudinal side rods 17 and 18 are provided with perforations 19a (Figs. 7 and 8) alining with the perforations in the hangers 20 and the sleeves 19 and through which is passed a bolt 20a. The perforations 19a being larger than the perforations in the hangers 20 and sleeves 19, permit movement of the sleeves 19 and hangers 20 relative to the longitudinal side rods 17 and 18. The bolt 20a provides a means for rigidly securing the sleeve 19 to the hanger 20 so that as the hangers 20 are rocked, the sleeve 19 will revolve on the rods while the bolt 20a will be free to a limited extent to move in the larger perforations in the ends of the rods 17 and 18. The lower ends 21 of the hangers 20 are curved inwardly and upwardly to conform to the inner curved surface of troughs 22, 23 so that the curved portions of the hangers may be neatly fitted within the troughs and secured thereto in any approved manner.

The troughs are semi-cylindrical in shape with their forward ends 25 formed semi-conically. This semi-conical formation of the ends of the troughs presents a flared opening for the passage between the troughs through which passage the cotton plants may pass without any obstruction. The rear portions of the troughs are closed by semicircular ends 26. The troughs are adapted to carry some kind of liquid for the purpose of destroying insects that fall into the same. Side plates 27 are secured to the downwardly-depending hanger arms 20 for enclosing the longitudinal sides of the insect exterminator, and are adapted to prevent the insects or vermin from being expelled outwardly and away from the troughs 22 and 23, thereby providing a deflecting means for directing the insects into the troughs.

The transverse bars 15 and 16, secured to the longitudinal side rods or tubes 17 and 18, extend slightly beyond said rods sufficiently to embrace the inner depending legs 3 of the wheeled supporting frame and prevent longitudinal motion between the insect exterminator and the wheeled supporting frame.

The upper ends 24 of the hangers 20 which rise above the sleeves 19 are perforated, through which are inserted the transverse screw-threaded rods 29 provided with adjusting nuts 30 and 31 located upon opposite sides of the upper ends of the hangers, and furnish means for bringing the upper portions 24 closer together or farther away from each other, whereby the corner posts or hangers 20 are oscillated and the troughs 22 and 23 are variously spaced from each other. A spring 32 surrounds the ends of the rods 29 and is mounted between the hangers and the nuts 30, providing a resilient mounting for said arms, whereby any obstruction which tends to force the troughs 22 and 23 apart will be resisted by the springs 32, but not sufficiently to prevent the sides of the exterminator from being slightly rocked to and fro to widen the passage 50 between the troughs for permitting some obstruction to pass between the same.

The side plates 27 are provided with vertical slots 33 (Fig. 4) in which are adapted to ride the inwardly-projecting pins 34 in the legs, whereby the pin 34 and the slot 33 cooperate with the projecting ends of the bars 15 and 16, to guide the insect exterminator in its vertical movement when the bolt 9 is operated through the nut 10 for elevating or lowering the said exterminator.

Secured to the underside of the longitudinal rods 17 and 18 are downwardly depending spaced bracket arms 35 and 36 adapted to support the inclined frames 37 and 38 which carry the inwardly projecting flexible fingers 39.

Each frame 37 and 38 comprises an upper flat bar 40 secured at its ends to the arms 35 and 36, and a lower bar 41 provided with sockets 42 in which are inserted the horizontal flexible fingers 39. These bars are secured together by means of a plurality of bolts 43 spaced along the bars, whereby as the nuts on the bolts are drawn up tight, the ends of the flexible fingers engaged by said bars will be clamped between said bars. Since these supporting frames 37 are inclined at an angle to the horizontal, the flexible fingers 39 will be spaced from each other at different heights, which are for practical purposes about an inch apart, so that the plants passing through the machine will be engaged by the various fingers at different elevations and thereby prevent injury to the plant, which would happen if all the fingers were placed in the same plane. In such case, the fingers would always engage the same portion of the plant as the plants pass through the device. The forward ends of the frames 37 are located at a considerably lower elevation than the rear ends, so that the lower branches of the plants 44, designated in dotted lines in Fig. 3, will be first engaged by the forward lower flexible fingers, and the plants will be kept in a constant state of vibration by the fingers arranged at gradually increasing heights throughout the length of the machine.

Each flexible finger 39 is provided with a central core 45 formed of a coil spring surrounded by an outer casing, preferably rubber tubing 46, the ends of which are sealed to keep out moisture. The coil spring 45 extends throughout the full length of the tubing 46, and as shown in Fig. 5, the finger is clamped between the upper and lower bars 40 and 41.

The wheeled supporting frame is adapted to be moved along the rows by means of handle bars 47, which are pivotally connected upon the inwardly extending fingers 34 secured to the legs 3 of the wheeled supporting hanger. The handle bars are further connected intermediate their ends by means of a horizontal link 48 which is connected to a leg 3 of the wheel supporting hanger. The link provides a means for maintaining the handle bars in an inclined position. A transverse bar 49 is mounted in the outer ends of the handle bars 47 and adapted to be gripped by a person operating the device to force the machine along the rows.

In operation, the wheels 6 are placed in straddling relation with a row of cotton plants and the nuts 31 on the rods 29 are adjusted to increase or decrease the width of the passage 50 between the troughs 22 and 23 depending upon the fullness of the growth of the plants.

The crank nut 10 is operated for elevating or lowering the central frame comprising the insect exterminator proper, and which carries the flexible fingers 39 for maintaining the cotton plants passing through the passage 50 in a constant state of vibration to dislodge the boll weevils from the plants and cause the weevils to drop into the poisonous liquids in the troughs 22 and 23.

The machine is forced along the rows of plants which enter the passage 50 through the flared opening at the front of the passage between the forward ends of the troughs.

At times, the troughs will meet with obstructions which tend to become wedged in the passage 50 between the troughs, but by reason of the fact that the corner posts formed by the vertical hangers 20 connected to the sleeves 19 are oscillatable on the ends of the rods 17 and 18, the troughs and the side plates 27, which are secured to said posts, will swing outwardly and away from each other and permit the obstruction to readily pass between the troughs. The springs 32 will cause the posts and troughs to return to their normal positions when the machine has passed beyond the influence of the obstruction.

Figs. 9 and 10 disclose a vehicle for carrying a plurality of insect destroying devices, each of which is adapted to straddle a row of plants, and each being similar in construction to the insect destroying device shown in Figs. 1 to 8, inclusive. I have marked the one to the right 68 and the one to the left 54. I have applied the same reference numerals to those parts which are common to the elements already described and shown in Figs. 1 to 8, inclusive. The construction of the hangers, troughs, fingers, etc., have not been changed.

Upon the inverted U-shaped wheeled supporting frames or hangers is rigidly mounted a transverse cross beam 1ª by means of bolts 51 and spaced plates 52.

A seat 53 is secured centrally of the cross beam 1ª for a driver. Any sort of well known means (not shown) is connected with the cross beam 1ª by which horses may be attached to the same for drawing the battery of insect destroying devices along the rows. The insect destroying device 54 is suspended from the left hand end of the beam 1ª by means of a U-shaped strap 55 straddling the cross beam. The U-shaped strap is provided with a plurality of spaced perforations 56 adapted to be traversed by a bolt 57 for adjusting the vertical position and supporting the device 54, the bolt 57 resting on a plate 58 which is seated on the top of the cross beam 1ª. A plate 59 is drawn up tight against the bottom of the beam 1ª by means of bolts 60. The U-shaped strap 55 is connected at its lower end to a transverse bar 67 of the device 54 by means of a bolt 66.

Upon the right hand end of the cross beam 1ª is seated a block 61, to which are secured depending straps 62, by means of bolts 63 passing through alined perforations in the straps and the block 61.

The lower ends of the straps 62 are perforated, through which perforations is inserted a bolt 64 in engagement with the bottom of the cross beam 1ª to prevent lateral displacement of the block 61 but permit longitudinal movement of the block along the cross beam 1ª. A U-shaped strap hanger 65 is connected by means of a bolt 66 to a transverse bar 67 connected to the side plates 27 of the insect destroying device 68.

The U-shaped strap 65 is provided with a plurality of perforations 69 through which is inserted a bolt 70 for supporting the device 68. The strap 65 and the entire device 68 are adjusted vertically relative to the cross beam 1ª, when the bolt 70 is applied in different perforations. The block 61 is provided with a recess in which is seated a plate 72 secured to the block 61 by means of the bolts 73. The bolt 70, which supports the U-shaped hanger 65, is inserted through the groove 71 and supported in a socket on the plate 72.

Pivotally connected at one end to the block 61 is a link 74 which, at its other end, is connected to an operating lever 75. The lever 75 is pivotally mounted at 76 on the cross-beam 1ª. A sector rack 77 is also rigidly mounted on the beam 1ª, the teeth of which are adapted to be engaged by a locking pawl 78 for locking the lever 75 in any one of a plurality of positions, so that as the lever 75 is moved back and forth, the block 61 will likewise be moved to carry the insect destroying device 68 towards or away from the insect destroying device 54.

Since rows of plants vary from 3 to 4½ feet, it will be necessary in employing a battery of insect destroying devices, to provide some means for adjusting one or more of the insect destroying devices along the axle 1ª in order to provide for the variation in the widths of the rows.

While the device 54 may be adjusted along the cross beam 1ª by loosening the bolts 60, and this may be necessary at certain times; nevertheless it is designed to be positioned rather rigidly on the beam 1ª. The insect destroying device 68 may be moved towards or away from the device 54 by releasing the pawl 78 from the rack 77 and oscillating the lever 75, so that the block 61 may be moved towards or away from the rack 77, and thereby adjust the insect destroying device 68 relative to the device 54.

As will be seen, the lever 75 is positioned conveniently for the driver of the machine, so that he may operate the device from the seat 53.

What is claimed is:—

1. A device of the class described comprising a wheeled supporting frame, a separate frame supported thereon, hangers mounted on said separate frame and carrying troughs, inwardly-extending fingers carried by the separate frame above the troughs, and means for automatically adjusting the hangers toward and from each other transversely of the frame and independently of the fingers.

2. A device of the class described comprising a wheeled supporting frame, a separate frame supported thereon, hangers mounted on said separate frame and carrying troughs, inwardly-extending fingers carried by the separate frame above the troughs, means for automatically adjusting the hangers toward and from each other transversely of the frame and independently of the fingers, and means cooperating with the separate frame to prevent longitudinal movement of the troughs while permitting their transverse adjustment.

3. A device of the class described comprising a wheeled supporting frame, a separate frame suspended from the wheeled frame and adjustable vertically relative thereto, hangers mounted on said separate frame and carrying troughs, inwardly-extending fingers carried by the separate frame above the troughs, and a pin and slot connection between the hangers and wheeled frame for guiding the troughs and fingers in their vertical adjustment.

4. A device of the class described comprising a wheeled supporting frame, a separate frame adjustable vertically on the wheeled frame and pivoted to swing as a unit transversely thereof, opposed series of fingers supported by the separate frame, hangers automatically adjustable toward and from each other transversely of the frame, and troughs supported by the hangers.

5. A device of the class described, comprising a wheeled supporting frame, a separate frame mounted for vertical adjustment on the wheeled frame and pivoted to swing as a unit transversely thereof, hangers pivoted to the separate frame so as to have a limited swinging movement toward and from each other, means for yieldingly holding said hangers at the inward limit of their swinging movement, troughs secured to the lower ends of the hangers, and inwardly-projecting fingers carried by the separate frame independently of the hangers and above the troughs.

6. A device of the class described, comprising a wheeled supporting frame, a separate frame mounted on the wheeled frame and comprising a pair of inclined frames and a pair of hangers, a plurality of rows of fingers secured to the inclined frames, and troughs carried by the hangers below the fingers.

7. A device of the class described comprising a wheeled supporting frame, a separate frame mounted for vertical adjustment on the wheeled supporting frame, hangers pivotally mounted in the separate frame, troughs secured to the lower ends of the hangers, depending spaced bracket arms rigidly secured to the separate frame independently of the troughs and having inwardly-projecting fingers, and resilient means for automatically and independently adjusting said troughs toward or away from each other and transversely of the wheeled supporting frame.

8. A device of the class described, comprising a wheeled supporting frame, a separate frame mounted on the wheeled frame, and including one or more inclined frames at each side, inwardly extending fingers carried by the inclined frames, and troughs located below the fingers and pivotally supported from the separate frame.

9. A device of the class described, comprising a wheeled supporting frame, a separate frame vertically adjustable on the wheeled frame, and including a pair of inclined frames at each side, fingers secured to the inclined frame and extending inwardly, and troughs pivotally supported below the fingers.

10. A device of the class described, comprising a wheeled supporting frame, a separate frame mounted on the wheeled frame, and including one or more inclined frames, each composed of an upper and a lower bar, sockets provided in said bars, fingers fitted in the sockets, means for securing the bars together, and troughs supported below the fingers.

11. In a device of the class described, a wheeled supporting frame, a separate frame comprising a plurality of vertical hangers, a pair of longitudinal rods, and pairs of inclined frames hung from said rods, means for pivotally connecting the hangers to the rods so that the hangers may move transversely, means for pivotally connecting the separate frame to the wheeled frame, fingers mounted in the inclined frame and extending inwardly toward each other, troughs mounted in the lower ends of the hangers, and resilient means for resisting the outward transverse movement of said hangers.

12. In a device of the class described, a wheeled supporting frame, a separate frame including rigidly mounted inclined frames and pivotally mounted vertical hangers, fingers mounted in the inclined frames, and troughs mounted in the hangers below the fingers, said troughs being larger than the length of the inclined frames.

13. In a device of the class described, a wheeled supporting frame comprising a transverse channel bar, inverted U-shaped supports having their base portions secured to the opposite ends of the channel bar and their legs depending downwardly from said bar, wheels mounted upon axles at the lower ends of the U-shaped supports, and a separate frame suspended from the channel bar and adapted to be adjusted vertically and provided with troughs and fingers.

14. In a device of the class described, a wheeled supporting frame, a separate frame provided with pivotally mounted sides carrying longitudinal troughs oscillatable towards each other, and stationary fingers mounted on the separate frame and arranged in a series inclined upwardly from the front.

15. In a device of the class described, a wheeled supporting frame, a separate frame having a vertical adjustment on the wheeled frame, inclined rows of stationary fingers mounted on the separate frame, troughs pivotally mounted on said separate frame, and guiding means for permitting transverse movement of but preventing longitudinal movement of the troughs relative to the wheeled frame while they swing about their pivots.

16. In a device of the class described, a wheeled supporting frame, a separate frame suspended from the wheeled frame, bracket arms rigidly mounted in longitudinal planes on the sides of the separate frame, inclined frames mounted on the bracket arms, fingers secured in spaced relation to the inclined frames, and troughs located below the fingers and supported by the separate frames.

17. In a device of the class described, a wheeled supporting frame comprising a transverse channel bar, inverted U-shaped supports secured to said bar, axles mounted in the lower ends of the U-shaped supports, wheels rotatably mounted on said axles, a separate frame suspended from the transverse channel bar and provided with fingers and troughs, and handle bars secured to the inverted U-shaped supports.

18. In a device of the class described, a wheeled supporting frame, a separate frame suspended from the wheeled supporting frame and comprising spaced longitudinal rods, vertical hangers oscillatable intermediate their ends at opposite ends of the longitudinal rods, a horizontal rod slidably mounted in a pair of the vertical hangers, the upper free ends of the vertical hangers extending above the longitudinal rods, resilient means acting on the ends of the vertical hangers for maintaining them in position while permitting a transverse swinging of said hangers, and troughs and side plates secured to the vertical hangers.

19. In a device of the class described, a wheeled supporting frame, longitudinal rods mounted for vertical adjustment on the supporting frame, side members oscillatable on the ends of the longitudinal rods, spring means for maintaining the side members in vertical position while permitting oscillation of said members, troughs mounted on the side members, and stationary fingers projecting inwardly from opposite sides of the supporting frame.

20. In a device of the class described, a wheeled supporting frame carrying flexible fingers projecting inwardly, said fingers each comprising a coiled spring, a rubber tubing surrounding said spring, and means for sealing the ends of the tubing to prevent the access of moisture.

21. A device of the class described, comprising a wheeled supporting frame adapted to span a plurality of plant rows, a bracket rigidly secured to the frame, an insect destroying unit supported on the bracket, a block slidably adjustable on the frame toward and away from said bracket, and a second insect destroying unit supported by said block.

22. A device of the class described, comprising a wheeled supporting frame adapted to span a plurality of plant rows, a bracket rigidly secured to the frame, an insect destroying unit pivotally supported on the bracket to swing laterally, a block slidably adjustable on the frame toward and away from said bracket, and a second insect destroying unit pivotally supported by said block to swing laterally.

23. A device of the class described, comprising a wheeled supporting frame adapted to span a plurality of plant rows, a plurality of insect destroying units, said units including means for acting on both sides of two adjacent rows, a bracket rigidly secured to the frame, on which one of said units is pivotally mounted, and a block mounted to slide on said frame toward and from said bracket, the other insect destroying unit being pivotally supported by said block.

24. A device of the class described, comprising a wheeled supporting frame provided with a transverse cross beam, an insect destroying unit rigidly supported on the beam, a block slidably mounted on the beam to move toward and away from said unit, a second insect destroying unit suspended from the block, means for adjustably moving the block with the second unit along the beam toward or away from the first unit, and means for locking the adjustable means to hold the second unit in its adjusted position.

25. A device of the class described, comprising a wheeled supporting frame provided with a transverse cross beam, a bracket rigidly supported on the beam, an insect destroying unit supported for vertical adjustment on said bracket, a block slidably mounted on the beam, a second insect destroying unit supported for vertical adjustment on the block, a lever pivotally mounted on the beam, a link connecting the lever to the block for adjustably moving said block with the second unit along the beam toward or away from the first unit, and means for locking said lever in its adjusted position.

26. A device of the class described, comprising a wheeled supporting frame having a transverse cross beam, a plurality of frame members suspended from the frame and provided with troughs and fingers inwardly projecting from the sides of the frame members, a block slidably mounted on the cross beam, one of said frame members being mounted on the block, and means for moving the block on the frame including means for locking the block in any one of its adjusted positions on the beam.

27. In a device of the class described, a supporting frame, longitudinal rods mounted thereon, sleeves mounted on said rods, bolts secured transversely of the sleeves, the rods being provided with slots through which the bolts pass whereby the sleeves have a limited oscillatory movement on the rods, and trough-supporting hangers secured intermediately to the sleeves, the upper ends of the hangers being resiliently held against relative oscillatory movement.

28. A device of the class described, comprising a wheeled frame adapted to span a plurality of plant rows and including a transverse beam, a supporting member rigidly secured to the beam and adjustable laterally thereon, an insect destroying unit supported on said member, a block slidably adjustable on the beam toward and away from said supporting member, and a second insect destroying unit supported by said block.

In testimony that I claim the foregoing as my own, I have hereto affixed my signature.

ARTHUR BRIGDEN.